United States Patent
Weaver et al.

(10) Patent No.: US 11,316,363 B2
(45) Date of Patent: Apr. 26, 2022

(54) ENERGY STORAGE SYSTEMS FOR ELECTRICAL MICROGRIDS WITH PULSED POWER LOADS

(71) Applicants: National Technology & Engineering Solutions of Sandia, LLC, Albuquerque, NM (US); Michigan Technological University, Houghton, MI (US)

(72) Inventors: Wayne W. Weaver, Hancock, MI (US); Rush D. Robinett, III, Tijeras, NM (US); David G. Wilson, Tijeras, NM (US)

(73) Assignees: National Technology & Engineering Solutions of Sandia, LLC, Albuquerque, NM (US); Michigan Technological University, Houghton, MI (US)

(*) Notice: Subject to any disclaimer, the term of this patent is extended or adjusted under 35 U.S.C. 154(b) by 62 days.

(21) Appl. No.: 17/038,187

(22) Filed: Sep. 30, 2020

(65) Prior Publication Data

US 2021/0119452 A1    Apr. 22, 2021

Related U.S. Application Data

(60) Provisional application No. 62/908,732, filed on Oct. 1, 2019.

(51) Int. Cl.
*H02J 7/34* (2006.01)
*H02J 1/10* (2006.01)
(Continued)

(52) U.S. Cl.
CPC .............. *H02J 7/34* (2013.01); *H02J 1/106* (2020.01); *H02J 3/30* (2013.01); *H02J 3/32* (2013.01)

(58) Field of Classification Search
CPC .... H02J 7/34–35; H02J 7/007; H02J 7/00711; H02J 1/10–12; H02J 1/14–16; H02J 3/28–322
See application file for complete search history.

(56) References Cited

U.S. PATENT DOCUMENTS

| | | | | |
|---|---|---|---|---|
| 2014/0339902 A1* | 11/2014 | Sepe, Jr. | ............... | H02M 3/158 307/80 |
| 2016/0197600 A1* | 7/2016 | Kuznetsov | ............... | H02J 1/16 307/106 |
| 2018/0166892 A1* | 6/2018 | Sepe, Jr. | ............... | H02J 7/345 |

FOREIGN PATENT DOCUMENTS

| CN | 108539727 A | * | 9/2018 |
|---|---|---|---|
| CN | 108667337 A | * | 10/2018 |

OTHER PUBLICATIONS

W. W. Weaver, M. M. Bijaieh, R. D. Robinett and D. G. Wilson, "Energy Storage Baseline Requirements for Pulsed Power Loads," Aug. 14, 2019, 2019 IEEE Electric Ship Technologies Symposium (ESTS), 2019, pp. 52-59. (Year: 2019).*

(Continued)

*Primary Examiner* — Rexford N Barnie
*Assistant Examiner* — David A Shiao
(74) *Attorney, Agent, or Firm* — Kevin W. Bieg

(57) ABSTRACT

Pulsed power loads (PPLs) are highly non-linear and can cause significant stability and power quality issues in an electrical microgrid. According to the present invention, many of these issues can be mitigated by an Energy Storage System (ESS) that offsets the PPL. The ESS can maintain a constant bus voltage and decouple the generation sources from the PPL. For example, the ESS specifications can be obtained with an ideal, band-limited hybrid battery and flywheel system.

6 Claims, 15 Drawing Sheets

(51) Int. Cl.
  H02J 3/32  (2006.01)
  H02J 3/30  (2006.01)

(56) References Cited

OTHER PUBLICATIONS

Jun Hou, Jing Sun, Heath Hofmann, "Control development and performance evaluation for battery/flywheel hybrid energy storage solutions to mitigate load fluctuations in all-electricship propulsion systems", Feb. 15, 2018, Applied Energy, vol. 212, 2018, pp. 919-930. (Year: 2018).*
Alon Kuperman, Ilan Aharon, "Battery-ultracapacitor hybrids for pulsed current loads: A review", Feb. 2011, Renewable and Sustainable Energy Reviews, vol. 15, Issue 2, 2011, pp. 981-992. (Year: 2011).*
N. R. Tummuru, M. K. Mishra and S. Srinivas, "Dynamic Energy Management of Hybrid Energy Storage System With High-Gain PV Converter," Sep. 26, 2014, in IEEE Transactions on Energy Conversion, vol. 30, No. 1, pp. 150-160, Mar. 2015. (Year: 2014).*
M. M. Mardani, M. H. Khooban, A. Masoudian and T. Dragičević, "Model Predictive Control of DC-DC Converters to Mitigate the Effects of Pulsed Power Loads in Naval DC Microgrids," Oct. 26, 2018, in IEEE Transactions on Industrial Electronics, vol. 66, No. 7, pp. 5676-5685, Jul. 2019. (Year: 2018).*
A. T. Elsayed, T. A. Youssef and O. A. Mohammed, "Modeling and Control of a Low-Speed Flywheel Driving System for Pulsed-Load Mitigation in DC Distribution Networks," Feb. 25, 2016, in IEEE Transactions on Industry Applications, vol. 52, No. 4, pp. 3378-3387, Jul.-Aug. 2016. (Year: 2016).*
Farhadi, M. and Mohammed, O., "Adaptive Energy Management in Redundant Hybrid DC Microgrid for Pulse Load Mitigation," IEEE Transactions on Smart Grid, 2015, vol. 6, pp. 54-62.
Weaver, W. W. et al., "Metastability of Pulse Power Loads Using the Hamiltonian Surface Shaping Method," IEEE Transactions on Energy Conversion, 2017, vol. 32, pp. 820-828.
Dougal, R. A. et al., "Power and Life Extension of Battery-Ultracapacitor Hybrids," IEEE Transactions on Components and Packaging Technologies, 2002, vol. 25, pp. 120-131.
Guerrero, J. M. et al., "Advanced Control Architectures for Intelligent Microgrids—Part II: Power Quality, Energy Storage, and AC/DC Microgrids," IEEE Transactions on Industrial Electronics, 2013, vol. 60, pp. 1263-1270.
Weaver, W. W. and Krein, P. T., "Optimal Geometric Control of Power Buffers," IEEE Transactions on Power Electronics, 2009, vol. 24, pp. 1248-1258.
Weaver, W. W. Dynamic Energy Resource Control of Power Electronics in Local Area Power Networks,, IEEE Transactions on Power Electronics, 2011, vol. 26, pp. 852-859.
Balog, R. S. et al., "The Load as an Energy Asset in a Distributed DC SmartGrid Architecture," IEEE Transactions on Smart Grid, 2012, vol. 3, pp. 253-260.
Yan, Z. and Zhang, X-P., "General Energy Filters for Power Smoothing, Tracking and Processing Using Energy Storage," IEEE Access, 2017, vol. 5, pp. 19373-19382.
Zhang, Y. and Li, Y. W., "Energy Management Strategy for Supercapacitor in Droop-Controlled DC Microgrid Using Virtual Impedance," IEEE Transactions on Power Electronics, 2017, vol. 32, pp. 2704-2716.
Dragicevic, T. et al., "Supervisory Control of an Adaptive-Droop Regulated DC Microgrid With Battery Management Capability," IEEE Transactions on Power Electronics, 2014, vol. 29, pp. 695-706.
Yuhimenko, V. et al., "DC Active Power Filter-Based Hybrid Energy Source for Pulsed Power Loads," IEEE Journal of Emerging and Selected Topics in Power Electronics, 2015, vol. 3, pp. 1001-1010.
Khan, K. et al., "Comparison of Li-Ion Battery Equivalent Circuit Modelling using Impedance Analyzer and Bayesian Networks," IET Electrical Systems in Transportation, 2018, vol. 8, pp. 197-204.
Vazquez, S. et al., "Energy Storage Systems for Transport and Grid Applications," IEEE Transactions on Industrial Electronics, 2010, vol. 57, pp. 3881-3895.

* cited by examiner

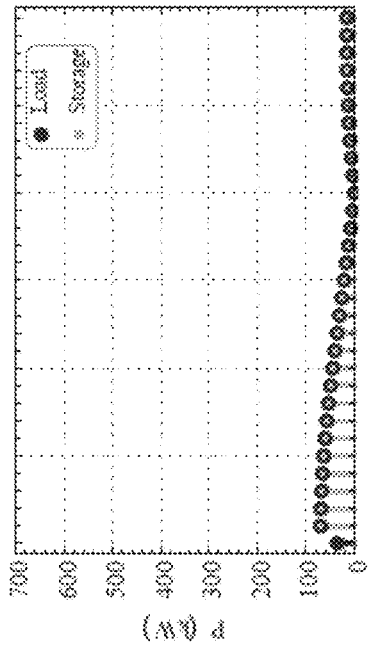
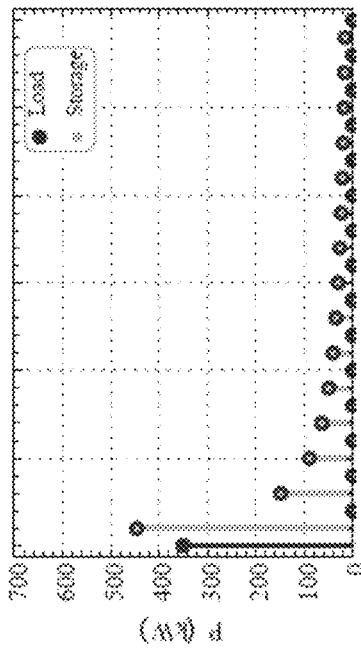
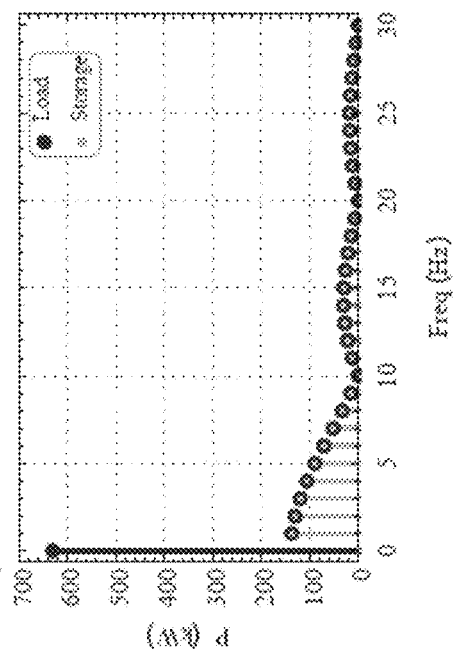
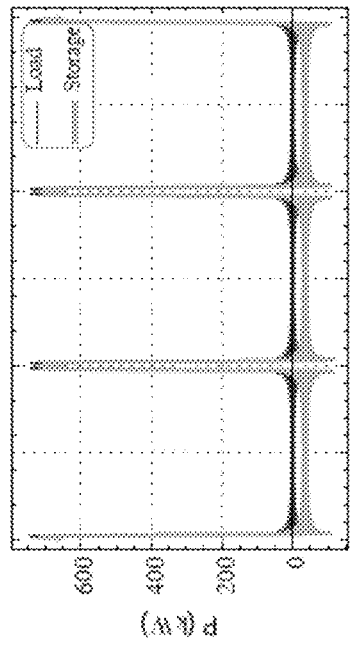
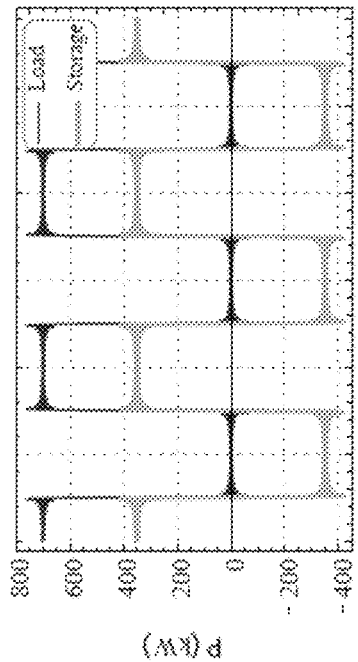
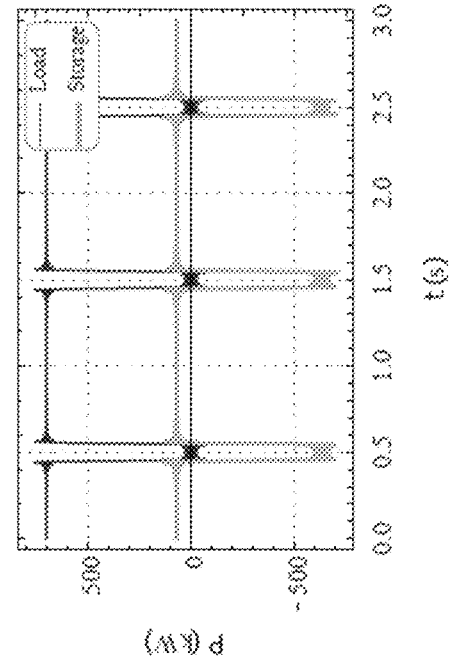
FIG. 10A
FIG. 10B
FIG. 10C

ENERGY STORAGE SYSTEMS FOR ELECTRICAL MICROGRIDS WITH PULSED POWER LOADS

CROSS-REFERENCE TO RELATED APPLICATION

This application claims the benefit of U.S. Provisional Application No. 62/908,732, filed Oct. 1, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to electrical microgrids and, in particular, to energy storage systems for electrical microgrids with pulsed power loads.

BACKGROUND OF THE INVENTION

Microgrids, with new designs and implementations, are growing to integrate various local generation capacities, as well as various types of loads. One emerging problem is the pulsed power load (PPL), which can add unwanted frequency content and instabilities to the bus voltage of the microgrid. See M. Farhadi and O. Mohammed, *IEEE Trans. Smart Grid* 6(1), 54 (2015). These fluctuations can cause the collapse of voltage and systemwide performance degradation and affect the power and energy transfer quality of the network. In an AC or DC microgrid system, the existence of nonlinear loads may compromise the stability of the system during the transients. See W. W. Weaver et al., *IEEE Trans. Energy Convers.* 32(2), 820 (2017). Given a PPL's peak power, period, and duty cycle, different energy storage systems (ESS) with different capacities and bandwidths of operation are needed to complement the load to fulfill voltage harmonics and noise goals, as well as control objectives. Super-capacitors, flywheels and batteries have already been used for these purposes. See R. A. Dougal et al., *IEEE Trans. Compon. Packag. Technol.* 25(1), 120 (2002). In DC microgrid systems with PPLs, the general approach is to decouple the load from the source by using appropriately large ESS. See J. M. Guerrero et al., *IEEE Trans. Ind. Electron.* 60(4), 1263 (2013). The ESS can mitigate instability of the system in a constant power approach. See A. L. Gattozzi et al., "Power system and energy storage models for laser integration on naval platforms," in *IEEE Electric Ship Technologies Symposium*, June 2015, pp. 173-180.

In a constant power load, the current is inversely proportional to the voltage. This creates a negative incremental impedance and can lead to instability with a pulsed power load. See R. D. Middlebrook, "Input filter considerations in design and application of switching regulators," in *Proc. IEEE Industry Applications Society Annual Meeting*, 1976, pp. 366-382; and W. W. Weaver and P. T. Krein, *IEEE Trans. Power Electron.* 24(5), 1248 (2009). Power buffers have been proposed to decouple the load from the grid and to compensate for non-linear load transients. See D. Logue and P. T. Krein, "The power buffer concept for utility load decoupling," in *IEEE Annual Power Electronics Specialists Conference*, vol. 2, 2000, pp. 973-978; W. W. Weaver and P. T. Krein, "Mitigation of power system collapse through active dynamic buffers," in *Power Electronics Specialists Conference*, vol. 2, June 2004, pp. 1080-1084; and W. W. Weaver, *IEEE Trans. Power Electron.* 26(3), 852 (2011). Load terminal characteristics are controlled to mimic a linear behavior. Ideally, the power buffer filters the fast dynamics of the load and decouples the load-side system from the grid-side dynamics. However, for large loads with extended transient times, a larger ESS is needed. See R. S. Balog et al., *IEEE Trans. Smart Grid* 3(1), 253 (2012).

ESS devices are widely used to improve power quality and energy transfer. See Z. Yan and X. P. Zhang, *IEEE Access* 5, 19 373 (2017). Typically, to compensate for the slow change of load power, such as in hourly variations, storage elements with high energy densities are required. In contrast, for faster variations, high power density and faster response rate devices are needed. Therefore, it is important to consider the frequency bandwidth capabilities of the ESS. While super-capacitors are suitable for high power bandwidth operations, batteries with lower bandwidths and higher energy densities alleviate power and energy deficiencies and extend the operating time. See Y. Zhang and Y. W. Li, *IEEE Trans. Power Electron.* 32(4), 2704 (2017); and T. Dragicevic et al., *IEEE Trans. Power Electron.* 29(2), 695 (2014).

SUMMARY OF THE INVENTION

The present invention is directed to energy storage systems (ESSs) for mitigating the effects of pulsed power loads (PPLs) on an electrical microgrid. A local ESS control can maintain the voltage and currents of a PPL system. As examples of the invention, ideal, band-limited and reduced-order hybrid battery and flywheel storage systems were simulated and compared to illustrate how a proper ESS technology based on cut-off frequency can meet bus voltage performance specifications. For the ideal loss-less system, the ESS can achieve zero energy trade over each cycle of the pulsed load duty cycle. On the other hand, the internal losses in the simulated battery and flywheel systems lead to an overall decrease in the energy of the battery and flywheel systems. For accurate sizing of the ESS it is important to account for losses. Optimization schemes can determine optimal power flow and/or optimal amount of series and parallel cells to reduce losses as well as relax the bus voltage constraint to explore the meta-stability boundary for reducing the overall size of the ESS.

BRIEF DESCRIPTION OF THE DRAWINGS

The detailed description will refer to the following drawings, wherein like elements are referred to by like numbers.

FIGS. 10A-10C are graphs of pulsed load and ESS powers in time and frequency domains. FIG. 10A is for a duty cycle of 5%. FIG. 10B is for a duty cycle of 50%. FIG. 10C is for a duty cycle of 90%.

FIG. 12A is for $\omega_{cut\text{-}off}$ of 100000 rad/s. FIG. 12B is for $\omega_{cut\text{-}off}$ of 100 rad/s. FIG. 12C is for $\omega_{cut\text{-}off}$ of 10 rad/s.

DETAILED DESCRIPTION OF THE INVENTION

The present invention is directed to an ESS system for an electrical microgrid with a PPL. The invention can specify the capacity and required frequency response capability of an aggregate ESS for a desired bus voltage characteristic, for example, to maintain a constant DC bus voltage while the storage element supplies the high frequency content of the load. The invention can provide trade-offs between bus voltage harmonic content and the ESS capacity and bandwidth. From the ideal baseline design of the ESS, different ESS technologies, batteries, super-capacitors, flywheels, for example, can be fitted together to cover the response spectrum established by the baseline design of the ESS.

Figure 1:
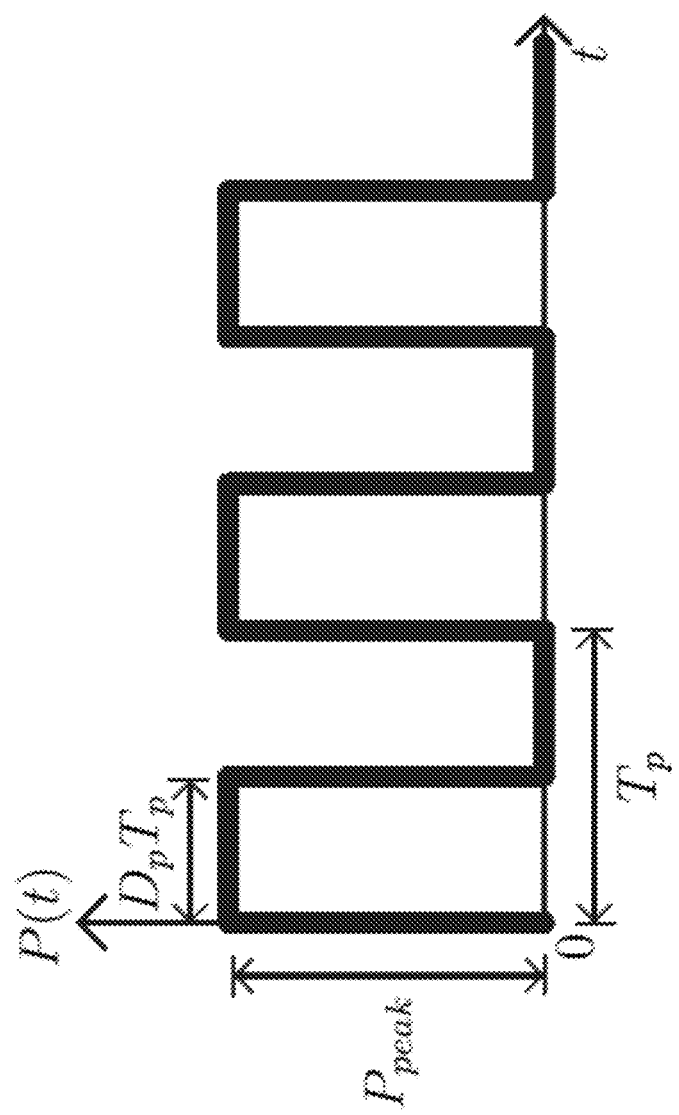
FIG. 1 is a plot of a pulse width modulated waveform with period of $T_p$, duty cycle of $D_p$, and peak power of $P_{peak}$.

A PPL is defined as a pulse-width modulated (PWM) waveform P(t) with a duty cycle $D_p$, period $T_p$, and peak value $P_{peak}$, as shown in FIG. 1. Pulse width modulation of the power is not to be confused with the pulse width modulation of the converter switch control. An average load power is defined to provide a constraint for overall ESS power flow. The ESS control objective is to maintain the load voltage and the grid-side current flow. The required energy capacity of the ESS is determined from the PPL peak power, duty cycle, and period characteristics. However, the quality of the maintained voltage and current depend upon the ESS bandwidth. The operation of the system under ideal, band-limited storage systems as well as reduced order flywheel, battery, and hybrid ESS systems are described below.

Pulsed Load System and Energy Storage Control

Figure 2:
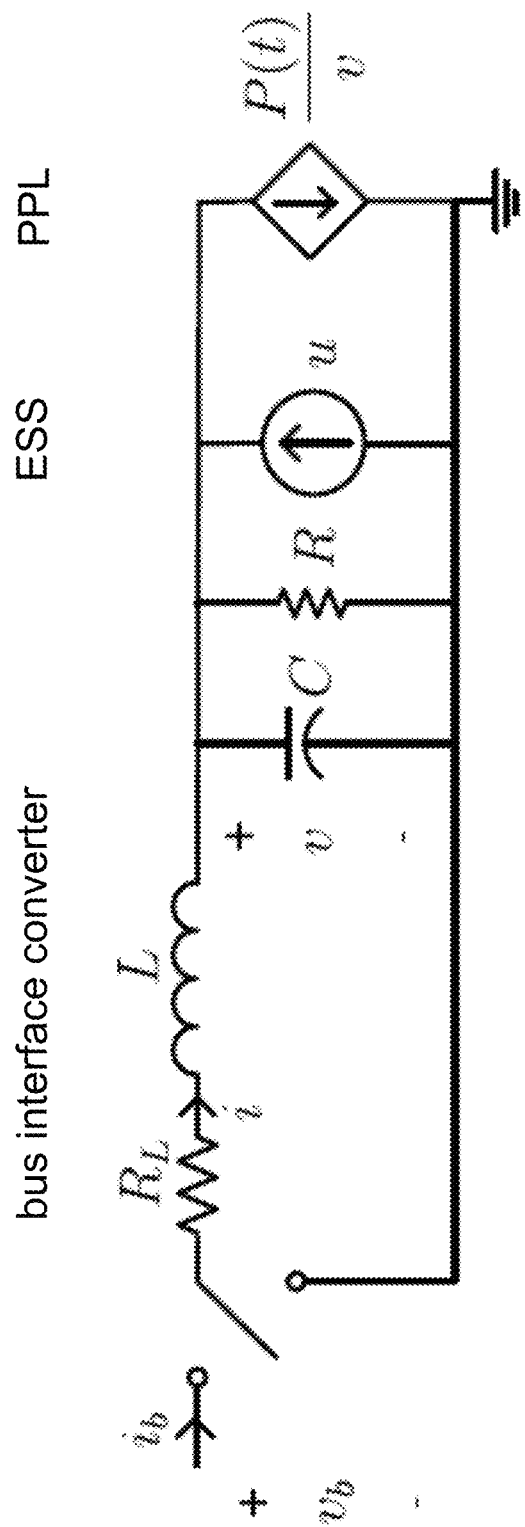
FIG. 2 is a pulse power load model with energy storage.

An example of a reduced-order model (ROM) comprising a bus interface converter, pulse load (PPL), and ideal energy storage element (ESS) is shown in FIG. 2. See W. W. Weaver et al., *IEEE Trans. Energy Conyers.* 32(2), 820 (2017). The state-space of the model is $$L\frac{di(t)}{dt} = -R_L i(t) - v(t) + \lambda v_b \qquad (1)$$

$$C\frac{dv(t)}{dt} = i(t) - \frac{p(t)}{v(t)} - \frac{v(t)}{R} + u \qquad (2)$$

where u represents a current injection from the ESS and P(t) is the PPL, as shown in FIG. 1. Furthermore in (1)-(2) $R_L$ represents the line resistance, L is the inductance, C is the bus capacitance and v(t) is the input source voltage. For the baseline analysis, the source bus voltage $v_b$ and the converter duty cycle $\lambda$ are assumed to be constant to isolate the ESS and pulse load. It is also assumed that the capacitor C is small so as not to affect the ESS performance. Then, u is the current of a single, or aggregated, ESS.

Energy Storage Control

For the baseline, the objective for the storage element u is to supply the necessary energy so that i and v are constant. Therefore, the steady-state average of (1)-(2) is $$0 = -R_L \bar{i} - \bar{v} + \lambda \bar{v}_b \qquad (3)$$

$$0 = -\bar{i} - \frac{\bar{P}}{\bar{v}} - \frac{\bar{v}}{R} + u \qquad (4)$$

where the time average load power is $$\bar{P} = \frac{1}{T_p}\int_0^{T_p} P(t)dt = D_p P_{peak}. \qquad (5)$$

Solving (3)-(4) for the average voltage and current, $\bar{v}$ and $\bar{i}$ yields $$\bar{v} = \frac{\sqrt{R(\lambda^2 \bar{v}_b^2 - 4R_L D_p P_{peak}(R+R_L))} + \lambda R \bar{v}_b}{2(R+R_L)} \qquad (6)$$

$$\bar{i} = \frac{\lambda \bar{v}_b(R+2R_L) - \sqrt{R(\lambda^2 R \bar{v}_b^2 - 4R_L D_p P_{peak}(R+R_L))}}{2R_L(R+R_L)} \qquad (7)$$

Then, the current from the ESS is $$u = \frac{2(R+R_L)(D_p P_{peak} - P(t))}{\sqrt{R(\lambda^2 R \bar{v}_b^2 - 4R_L D_p P_{peak}(R+R_L))} + \lambda R \bar{v}_b} \qquad (8)$$

The power from the storage device is then $$P_u(t) = v_u = P(t) - D_p P_{peak}. \qquad (9)$$

Integrating the storage power over the period of positive power output yields $$W_u = \int_0^{T_p} P_u(t)dt = \int_0^{T_p}(P(t) - D_p P_{peak})dt \qquad (10)$$

$$= \int_0^{D_p T_p}(P_{peak} - D_p P_{peak})dt$$

-continued $$= \int_0^{D_p T_p} (P_{peak}(1-D_p)) dt$$

$$= -(D_p - 1)D_p T_p P_{peak}$$

where $W_u$ is the baseline total energy storage capacity of the ESS.

The total energy supplied from the ESS element u, over the period $T_p$, is zero. Then the ESS control law (8) is derived from the average power in (5). If losses in the ESS are considered, (9) can be modified and combined with (5) to compensate. However, losses are neglected herein since this description is primarily focused on the baseline terminal characteristics of the ESS.

The maximum of (10) over one load cycle is found from $$\frac{dW_u}{dD_p} = 0 = T_p P_{peak} - 2D_p T_p P_{peak} \qquad (11)$$

$$= T_p P_{peak}(1 - 2D_p).$$

Hence, the maximum required ESS storage capacity is when $D_p = \frac{1}{2}$.

Linear Methods for Stability Bounds

For small-signal stability analysis the linear model of the form $$\dot{x} = Ax + Bu, \qquad (12)$$

is used. The small-signal A matrix for (1)-(2) is $$A = \begin{bmatrix} -\frac{R_L}{L} & -\frac{1}{L} \\ \frac{1}{C} & \frac{D_p P_{peak}}{v_o^2} - \frac{1}{R} \\ & C \end{bmatrix}. \qquad (13)$$

The characteristic equation of (12) with (13) is $$s^2 + s\left(\frac{1}{CR} + \frac{R_L}{L} - \frac{D_p P_{peak}}{Cv_o^2}\right) + \left(\frac{R_L}{CLR} + \frac{1}{CL} - \frac{R_L D_p P_{peak}}{CLv_o^2}\right) = 0. \qquad (14)$$

For stability, the terms of (14) should be $$\frac{R_L}{CLR} + \frac{1}{CL} - \frac{R_L D_p P_{peak}}{CLv_0^2} = \frac{1 + R_L\left(\frac{1}{R} - \frac{D_p P_{peak}}{v_o^2}\right)}{CL} > 0 \qquad (15)$$

and $$-\frac{D_p P_{peak}}{Cv^2} + \frac{1}{CR} + \frac{R_L}{L} = \frac{\frac{1}{R} - \frac{D_p P_{peak}}{v_o^2}}{C} + \frac{R_L}{L} > 0. \qquad (16)$$

Then, the system is stable if $$0 < R \le \frac{v_o^2}{D_p P_{peak}}, \qquad (17)$$

where $$\frac{v_o^2}{D_p P_{peak}}$$

is the equivalent average impedance of the pulse load. The above inequality implies if the resistive load R dissipates more power than the average pulse load, then it is stable. However, if this is not the case and R is $$R > \frac{v_o^2}{D_p P_{peak}} \qquad (18)$$

then the system is stable if the inductance and series inductor resistance are chosen such that $$0 < L < \frac{CR^2 v_o^4}{(v_o^2 - RD_p P_{peak})^2} \qquad (19)$$

$$\frac{L(RD_p P_{peak} - v_o^2)}{CRv_o^2} < R_L < \frac{Rv_o^2}{RD_p P_{peak} - v_o^2}. \qquad (20)$$

In (20) the series resistance $R_L$ must be less than the total load impedance which is equivalent to impedance matching for maximum power transfer. The equivalent parallel impedance is $$\frac{v_o^2}{D_p P_{peak}} // R = \frac{Rv_o^2}{RD_p P_{peak} + v_o^2} > R_L, \qquad (21)$$

which is the upper constraint on $R_L$.

Energy Storage Frequency Content

Any periodic function, linear or nonlinear, can be represented as a Fourier series. The Fourier series of a PWM function is $$f_{PWM}(t) = D_p + \frac{2}{\pi} \sum_{n=1}^{\infty} \frac{\sin(n\pi D_p)}{n} \cos\left(n\frac{2\pi}{T_p}t\right), \qquad (22)$$

where $D_p$ is the duty cycle, $T_p$ is the period, and the magnitude of the pulse is unity. The frequency content of the PWM pulse load signal is then $$P(t) = P_{peak}\left(D_p + \frac{2}{\pi} \sum_{n=1}^{\infty} \frac{\sin(n\pi D_p)}{n} \cos\left(n\frac{2\pi}{T_p}t\right)\right). \qquad (23)$$

The ESS ideally only provides the AC content of the signal and the DC is provided by the source(s). The frequency content of storage device power is then $$P_u(t) = P(t) = D_p P_{peak} \qquad (24)$$

-continued $$= P_{peak} \frac{2}{\pi} \sum_{n=1}^{\infty} \frac{\sin(n\pi D_p)}{n} \cos\left(n\frac{2\pi}{T_p}t\right).$$

From (8) and (24), the storage device current is $$u = \frac{2(R+R_L)\left(P_{peak}\frac{2}{\pi}\sum_{n=1}^{\infty}\frac{\sin(n\pi D_p)}{n}\cos\left(n\frac{2\pi}{T_p}t\right)\right)}{\sqrt{R(\lambda^2 R v_b^2 - 4R_L D_p P_{peak}(R+R_L))} + \lambda R v_b}. \quad (25)$$

The ESS current injection in (25) is the baseline reference signal such that the load voltage remains constant and the source only supplies the average power. For any other choice or implementation of an ESS other than (25), there will be harmonic content on the bus voltage and in the source power. It should also be noted that (25) is an infinite sum, which implies any real ESS (which is band-limited) will not be able to meet the baseline. As described below, band-limited storage devices in ideal form as well as reduced-order flywheel and battery models can be specified for the system.

Band-Limited ESS

Figure 3:
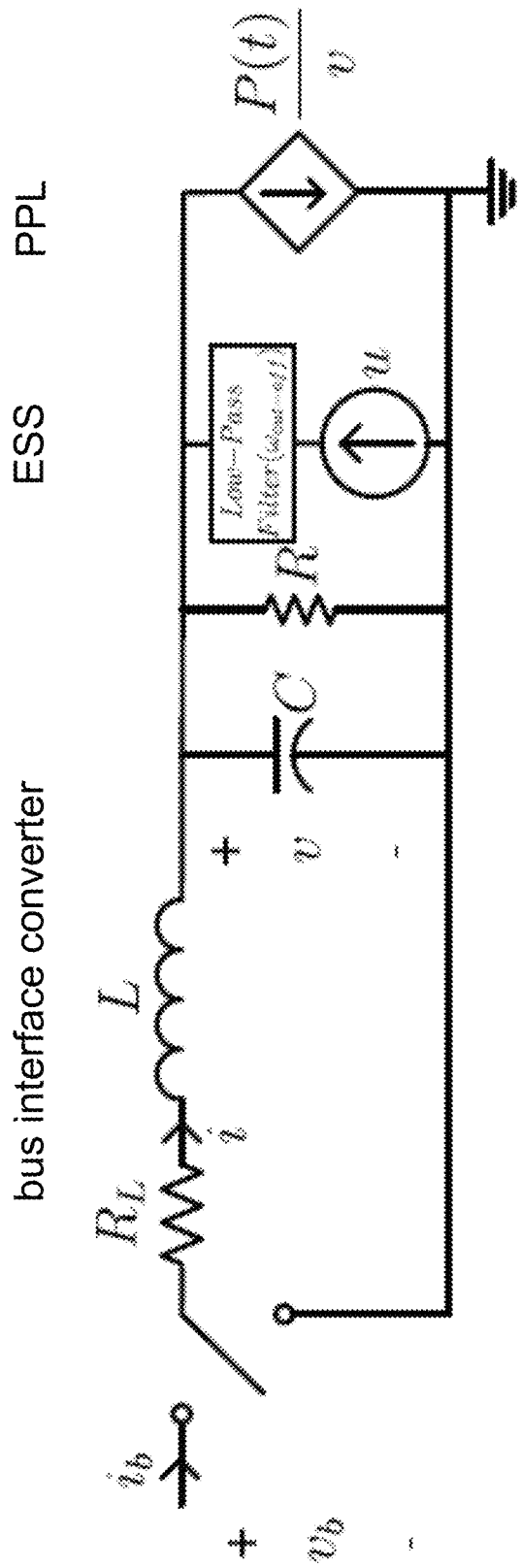
FIG. 3 is a pulse power load model with band-limited energy storage.
Figure 4:
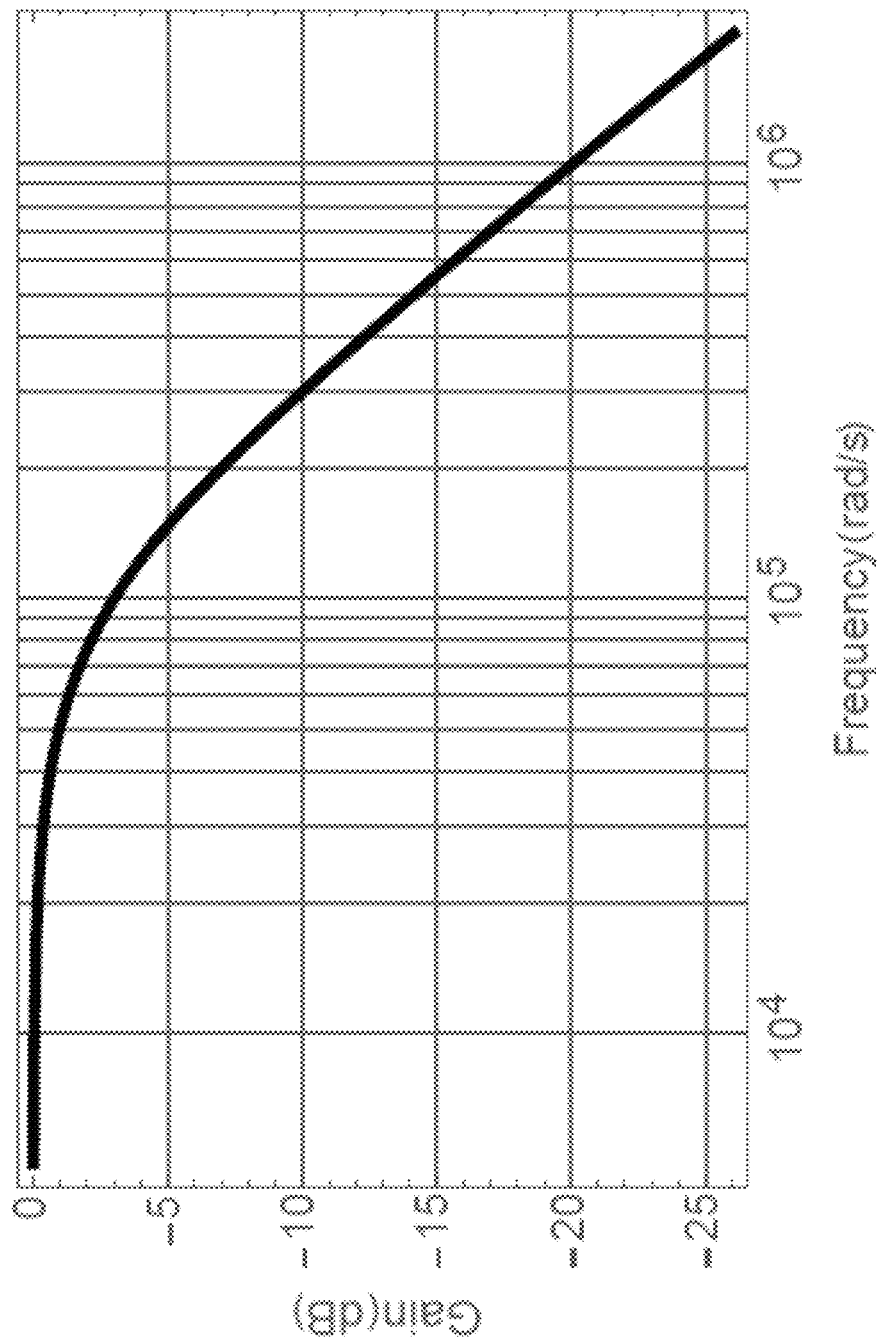
FIG. 4 is a graph of a first-order filter when $\omega_{cut-off} = 100000$ rad/s.
Figure 5:
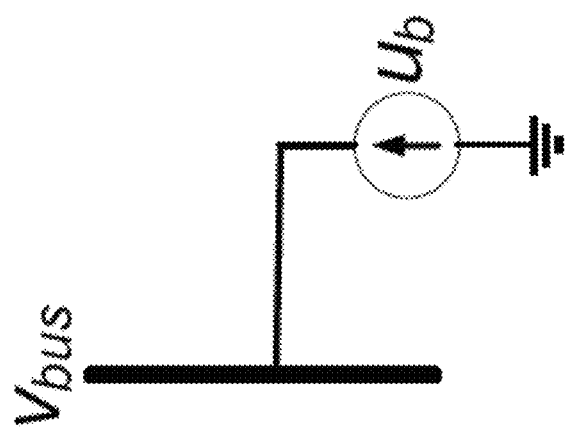
FIG. 5 is an illustration of the overall form of flywheel and battery models.

The operational bandwidth of any real ESS devices is limited. In general, the ESS can be modeled as a Low Pass Filter (LPF). See Z. Yan and X. P. Zhang, *IEEE Access* 5, 19 373 (2017); and V. Yuhimenko et al., *IEEE J. Emerg. Sel. Topics Power Electron.* 3(4), 1001 (2015). The cut-off frequency of this LPF depends on the ESS technology, control and other specifications. However, a generic ESS can be modeled as an LPF described as $$\frac{du_f}{dt} = \omega_{cut\text{-}off}(u - u_f) \quad (26)$$

where u is the ESS control reference command, $u_f$ is the injected current and $\omega_{cut\text{-}off}$ is the cut-off frequency, as shown in FIG. 3. FIG. 4 demonstrates the gain versus the frequency of (26) when $\omega_{cut\text{-}off}$=100000 rad/s. Flywheel and battery system models for the band-limited ESS are described below. The flywheel and battery devices are used to meet the ESS bandwidth and capacity requirements, respectively. For both devices, the overall topology is as shown in FIG. 5. Other EES technologies are also shown below to have similar responses.

Flywheel System and Control

Figure 6:
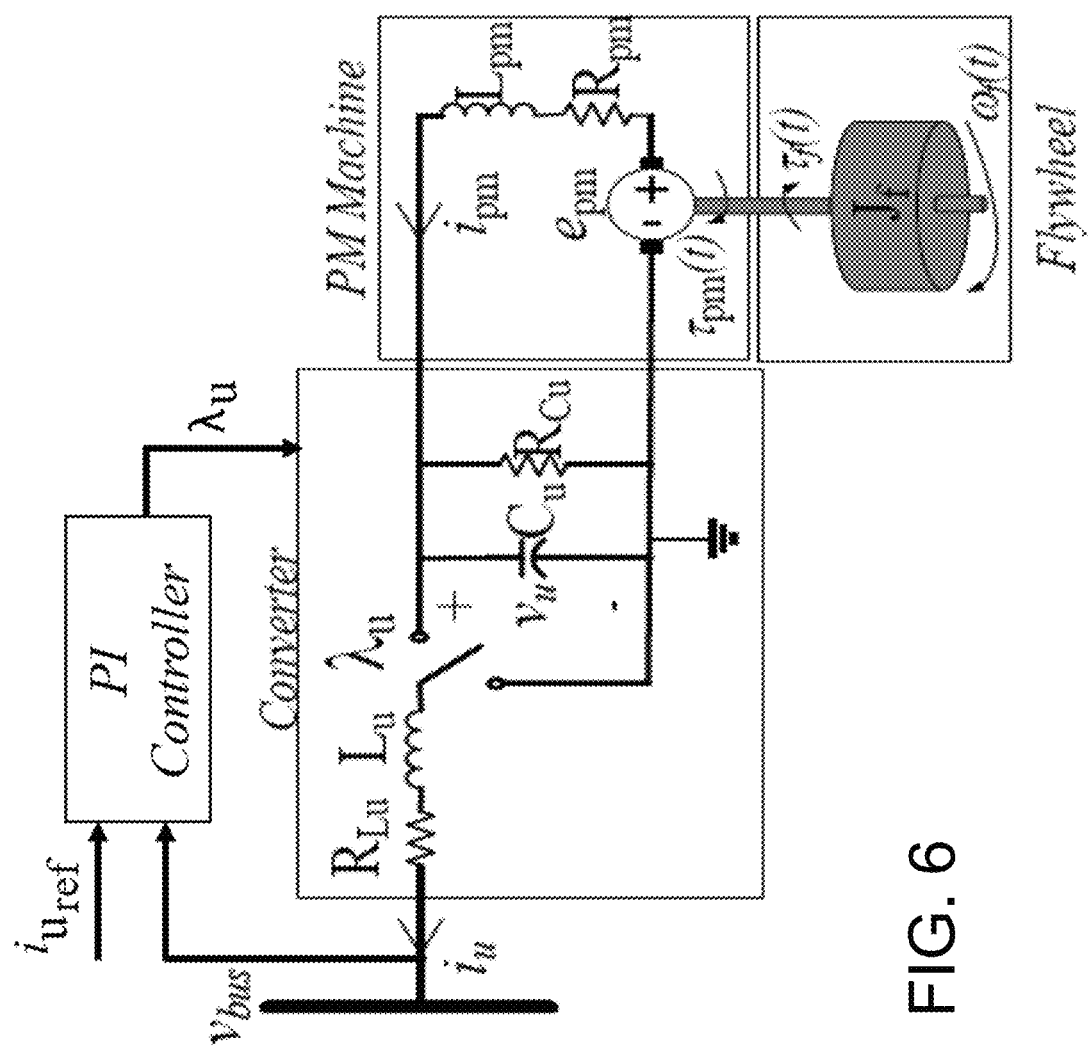
FIG. 6 is a flywheel model bus interface converter.

A generalized reduced-order flywheel energy storage model is shown in FIG. 6. The flywheel system descriptions and parameters for a reduced-order flywheel device are given in Table I. This simplified model contains a spinning mass flywheel, Permanent Magnet (PM) DC machine, and a DC-DC converter to interface with the load bus.

TABLE I

FLYWHEEL CELL SYSTEM AND CONTROL PARAMETERS

| Parameter | Description | Value |
|---|---|---|
| *Flywheel System Parameters* | | |
| $J_f$ | Moment of Inertia | 0.018 Kg m² |
| $k_t$ | Torque Constant | 1 Nm/A |
| $R_{pm}$ | Armature Resistance | 0.05 Ω |
| $L_{pm}$ | Armature Inductance | 10 mH |
| $C_u$ | Converter Capacitance | 1000 µF |
| $R_{Cu}$ | Converter Resistance | 10 KΩ |
| $L_u$ | Line Inductance | 10 mH |
| $R_u$ | Line Resistance | 0.01 Ω |
| B | Windage Friction Coefficient | 0.001 Nm/$\frac{rad}{s}$ |
| *Control Gains* | | |
| $k_i$ | Bus current integral gain | 10 |
| $k_p$ | Bus current proportional gain | 1 |

Simplifying assumptions this analysis include switching effects are ignored and the converter mode is average mode with control input duty cycle $\lambda_u$. Typically, the machine would be a 3-phase induction machine or switched reluctance machine, but a PMDC model is used for this example. Then, the minimum speed of the flywheel to support a bus voltage yields $$e_{pm} = k_t \omega_f(t) \geq v_{bus}, \forall t. \quad (27)$$

Therefore, a buck converter in current source mode, shown in FIG. 6, can be used as the bus interface. The energy stored in the flywheel is $$W_f = \frac{1}{2} J_f \omega_f(t)^2. \quad (28)$$

Hence, the minimum energy stored in the device is $$W_{f,min} = \frac{1}{2} J_f \left(\frac{v_{bus}}{k_t}\right)^2. \quad (29)$$

The overall power losses in the device are $$P_{loss}(t) = R_{pm} i_{pm}^2(t) + R_{Lu} i_u^2(t) + \frac{v_u^2(t)}{R_{Cu}} + B\omega_f^2(t). \quad (30)$$

The electrical torque and speed voltage of the PMDC machine are $\tau_{pm} = k_t i_{pm}(t)$ and $e_{pm} = k_t \omega_f(t)$ respectively. The overall flywheel state-space model is $$J_f \frac{d\omega_f}{dt} = -B\omega_f(t) - k_t i_{pm}(t) \quad (31)$$

$$L_{pm} \frac{di_{pm}}{dt} = k_t \omega_f(t) - R_{pm} i_{pm}(t) - v_u(t) \quad (32)$$

$$C_u \frac{dv_u}{dt} = -\frac{v_u(t)}{R_{Cu}} + i_{pm}(t) - \lambda_u i_u(t) \quad (33)$$

$$L_u \frac{di_u}{dt} = -u_{bus} - R_{Lu} i_u(t) + \lambda_u v_u(t). \quad (34)$$

The injected current from this ESS is required to track the ESS control law (8). A simple PI control can be used to enforce the reference current command such that the error value is $$e_p = i_{u,ref}(t) - i_u(t) \tag{35}$$

$$\frac{de_i}{dt} = e_p \tag{36}$$

$$\lambda_u = k_i e_i + k_p e_p \tag{37}$$

$$0 \leq \lambda_u \leq 1. \tag{38}$$

Figure 7:
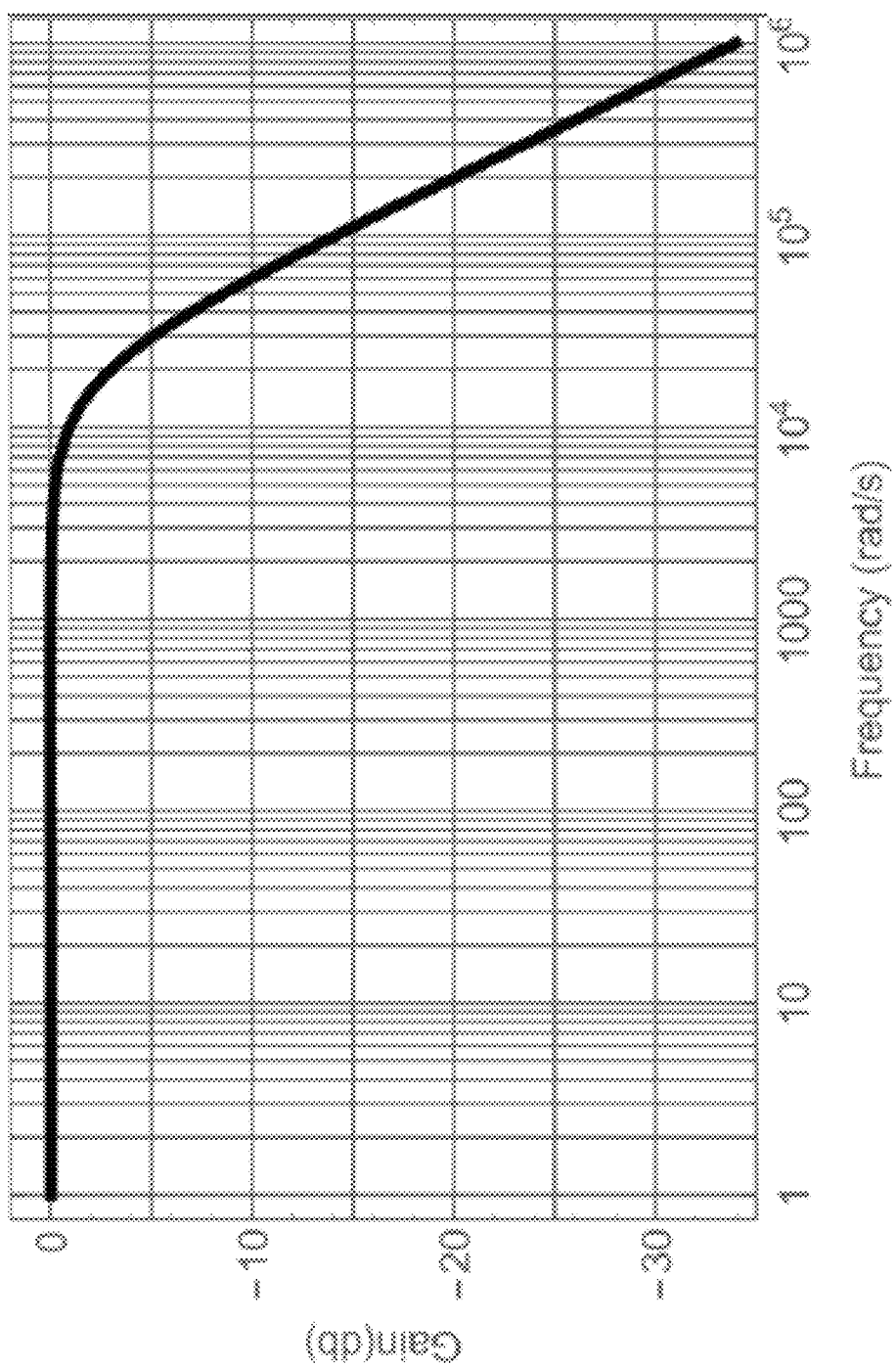
FIG. 7 is a graph of the frequency response of a flywheel system.

As shown in FIG. 6, the controller attempts to minimize the error $e_p$ over time by adjustment of the control variable $\lambda_u$. The effectiveness of the current tracking depends on the response of the system. The overall frequency response for the band-limited flywheel storage system in (31)-(34) with its control in (35)-(38) is shown in FIG. 7.

Battery System and Control

Figure 8:
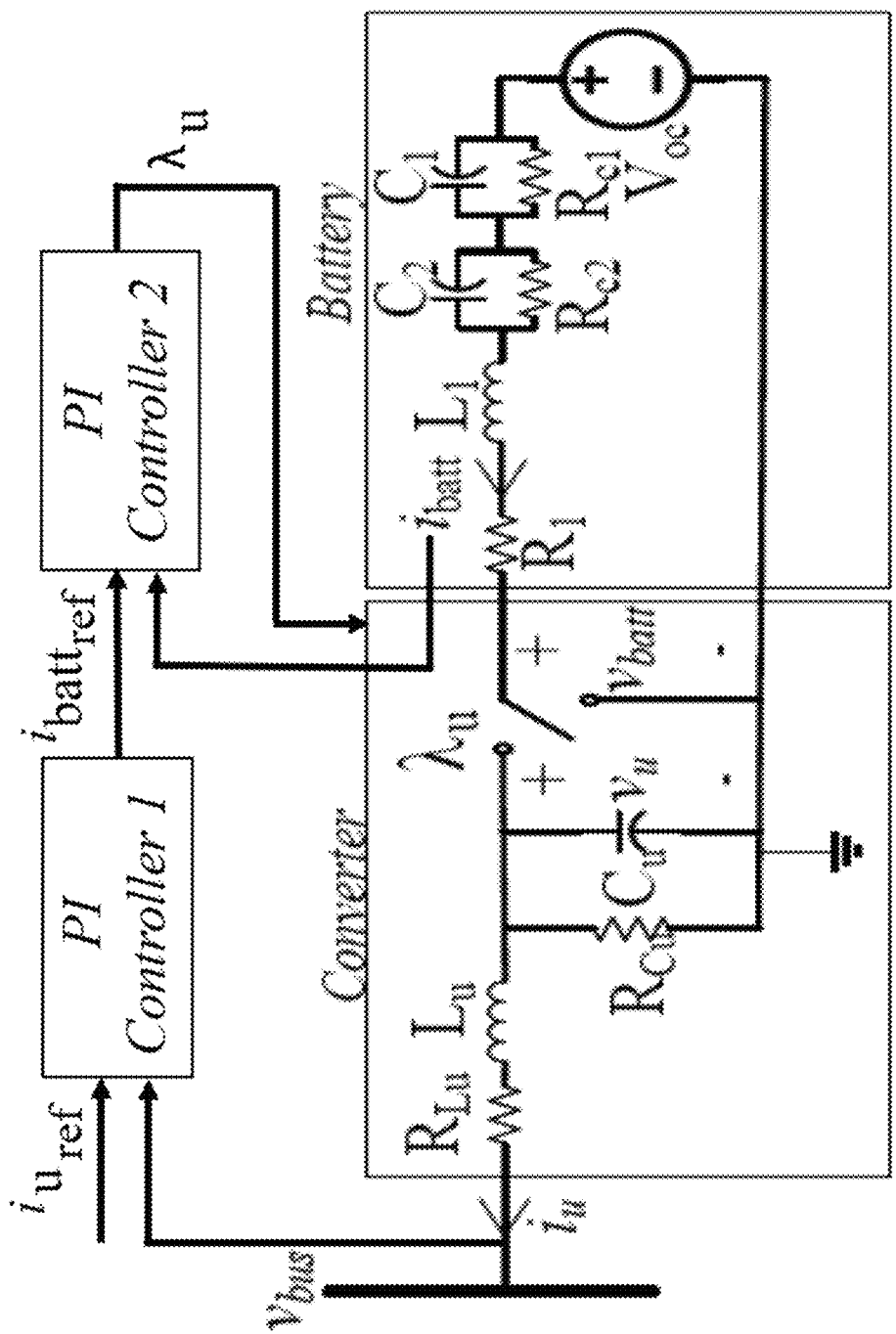
FIG. 8 is a battery system model with bus interface converter.

A generalized reduced-order battery and converter model is shown in FIG. 8. See K. Khan et al., *IET Elect, Syst. Transport.* 8(3), 197 (2018). Relevant system parameter descriptions are presented in Table II. In this model the converter is an average mode model with control input duty cycle $\lambda_u$, and $v_{batt} < v_{bus}$. $R_{c1}$ is very large and $R_{c2}$ is small.

TABLE II

BATTERY CELL SYSTEM PARAMETERS

| Parameter | Description | Value |
|---|---|---|
| $V_{oc}$ | Open Circuit Voltage | 48 V |
| Q | Max charge capacity | 10 A · Hr |
| $C_1$ | Electrochemical Polarization Capacitance | 750 F |
| $R_{c1}$ | Electrochemical Polarization Resistance | 10 KΩ |
| L | Equivalent Series Inductance | 0.17 μH |
| R | Equivalent Series Resistance | 0.31 Ω |
| $C_2$ | Concentration Polarization Capacitance | 400 F |
| $R_{c2}$ | Concentration Polarization Resistance | 0.24 mΩ |
| $C_u$ | Converter Capacitance | 10 μF |
| $R_{Cu}$ | Converter Resistance | 1 KΩ |
| $L_u$ | Line Inductance | 10 mH |
| $R_u$ | Line Resistance | 0.1 Ω |
| Control Gains | | |
| $k_{i,u}$ | Bus current integral gain | 300 |
| $k_{p,u}$ | Bus current proportional gain | 20 |
| $k_{i,batt}$ | Battery current integral gain | 1000 |
| $k_{p,batt}$ | Battery current proportional gain | 100 |

The energy discharged from the battery is measured in terms of the sum of charge provided over some period as $$Ah = \frac{\int_0^t i_{batt}(\tau)d\tau}{3600 \frac{s}{hr}}. \tag{39}$$

A battery has a maximum storage capacity $(Ah)_{capacity}$. The State-of-Charge (SOC) of the battery is calculated as $$SOC(\%) = 100 \frac{(Ah)_{capacity} - Ah}{(Ah)_{capacity}} \tag{40}$$

where SOC of 100% and 0% denote fully charged and fully discharged battery storage, respectively. The energy stored in the battery is $$W_c(t) = \tfrac{1}{2} C v_c^2(t) \tag{41}$$

where C is the equivalent bulk capacitance of the battery. The energy available in the battery is $$Q = \frac{1}{3600} \int i_{batt}(t)dt = \frac{Cv_c}{3600}. \tag{42}$$

The SOC of the battery is found from $$SOC = \frac{Q - \frac{Cv_c}{3600}}{Q}. \tag{43}$$

The battery losses are $$P_{loss} = i_{batt}^2(t) R_{batt} + \frac{v_{c1}^2(t)}{R_{c1}} + \frac{v_{c2}^2(t)}{R_{c2}}. \tag{44}$$

The state-space model of the battery storage system in FIG. 8 is $$C_1 \frac{dv_{c1}}{dt} = -i_{batt} - \frac{v_{c1}}{R_{c1}} \tag{45}$$

$$L_1 \frac{di_{batt}}{dt} = -R_1 i_{batt}(t) + v_{c1}(t) + v_{c2}(t) + V_{ac} - \lambda_u v_u(t) \tag{46}$$

$$C_2 \frac{dv_{c2}}{dt} = -i_{batt}(t) - \frac{v_{c2}}{R_2} \tag{47}$$

$$C_u \frac{dv_u}{dt} = \lambda i_{batt}(t) - \frac{v_u(t)}{R_{Cu}} - i_u(t) \tag{48}$$

$$L_u \frac{di_u}{dt} = -v_{bus} - R_{Lu} i_u(t) + v_u(t). \tag{49}$$

Figure 9:
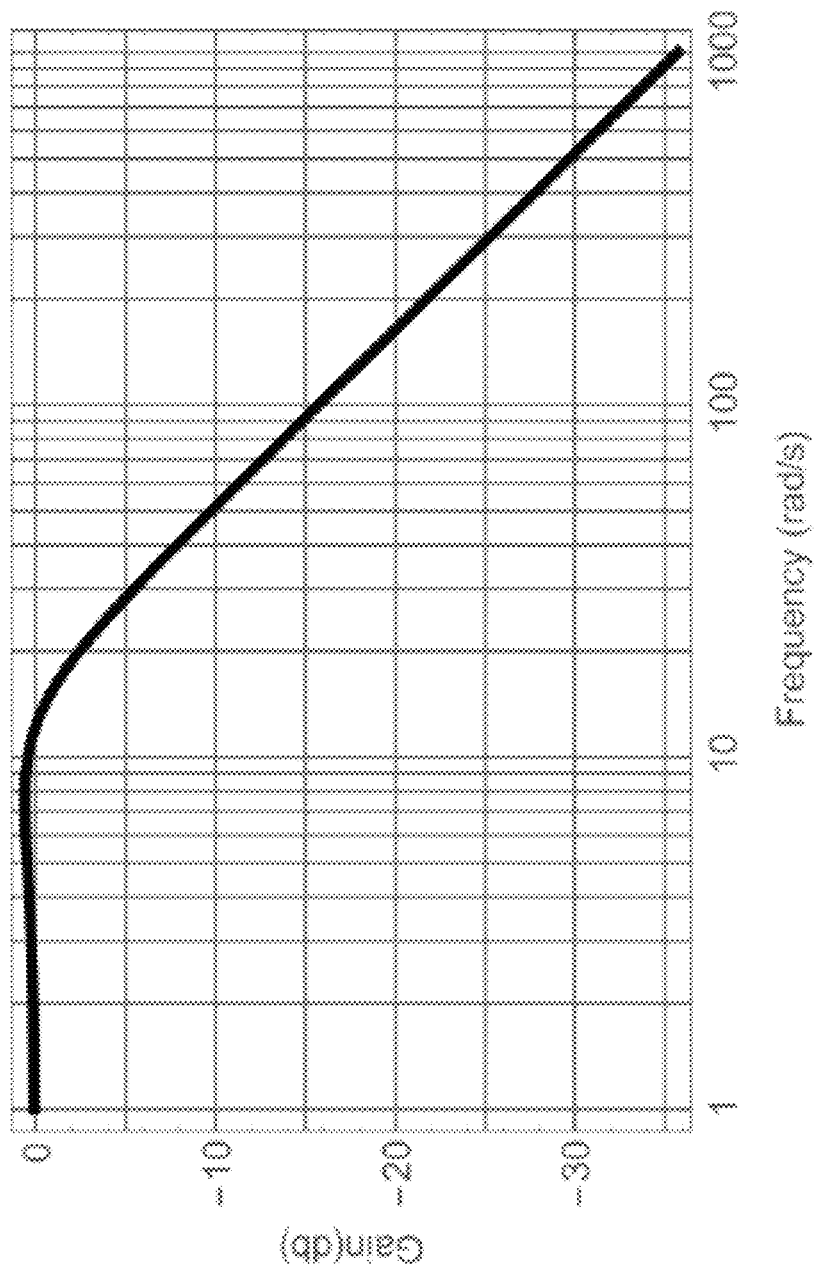
FIG. 9 is a graph of the battery system frequency response.

The control of the boost converter can be obtained from two nested PI loops $$e_p = i_{u,ref}(t) - i_u(t) \tag{50}$$

$$\frac{de_i}{dt} = e_p \tag{51}$$

$$i_{batt,ref} = k_{i,u} e_i + k_{p,u} e_p \tag{52}$$

$$e_{p,batt} = i_{batt,ref}(t) - i_{batt}(t) \tag{53}$$

$$\frac{de_{i,batt}}{dt} = e_{p,batt} \tag{54}$$

$$\lambda_u = -k_{i,batt} e_{i,batt} - k_p e_{p,batt} + 1 \tag{55}$$

$$0 \leq \lambda_u \leq 1, \tag{56}$$

where the inner loop controls the battery current $i_{batt}$ and the outer loop controls the bus injection current $i_u$, as shown in FIG. 8. The low pass filter representation of the battery system with its control is demonstrated in FIG. 9.

Hybrid Battery and Flywheel System

Battery and flywheel hybrid storage systems have been widely used to take advantage of the battery energy density and the flywheel's higher response rate and power density. See S. Vazquez et al., *IEEE Trans. Ind. Electron.* 57(12), 3881 (2010); and L. Gauchia et al., "New approach to supercapacitor testing and dynamic modelling," in *IEEE Vehicle Power and Propulsion Conference, September* 2010, pp. 1-5. Here, the hybrid system consists of a parallel battery and flywheel configuration. The battery system is considered as the primary low frequency ESS and the flywheel system compensates at higher frequencies. The reference signals for individual flywheel and battery cells are $$i_{fw,ref} = \frac{i_{u,ref,total} - i_{u,batt,meas} N_{p,batt}}{N_{p,fw}} \quad (57)$$

$$i_{batt,ref} = \frac{i_{u,ref,total}}{N_{p,batt}} \quad (58)$$

where $N_{p,batt}$ and $N_{p,fw}$ are the number parallel cells for battery and flywheel systems, respectively. The reference current is $i_{u,ref,total}$ for the overall hybrid system, and $i_{u,batt,meas}$ is the measured current injected by the overall battery storage system.

EXAMPLES

Three examples of the invention are described below. First, a numeric example presents the behavior of the pulse load system from FIG. 2 when the ESS is controlled according to (25). The second example presents the case when the storage system is a generic band-limited ESS as shown in FIG. 3. The third example demonstrates the pulse load system behavior when the baseline ESS is replaced by band limited combination of battery and flywheel storage systems. For this hybrid system, the battery and flywheel systems each comprise series and parallel cells so that they can support the load voltage level as well as the requested current. For this hybrid case, the parameters are given in Tables I and II corresponding to FIG. 6 and FIG. 8, respectively.

The parameters for the hybrid storage are chosen such that the overall storage meets the minimum requirements given in (10). As described above, the control law in (8) accounts only for loss-less ESS. This implies that if an auxiliary energy source is not available over a finite amount of time, the battery and flywheel elements will lose energy (proportional to (30) and (44)) to a point that they cannot support the system current defined by (8). The considerations for control of lossy storage systems can bring about several optimization paths. However, here the capacity of the storage system is chosen so that the storage system can sustain the load for sufficiently long periods of time.

The bandwidths of operation for battery and flywheel systems also depend on their respective control gains. For this example, some reasonable control gains (shown in Tables I and II) are chosen so that the inherent bandwidths of each storage type are not significantly affected.

Frequency Content of Baseline ESS

Figure 11:
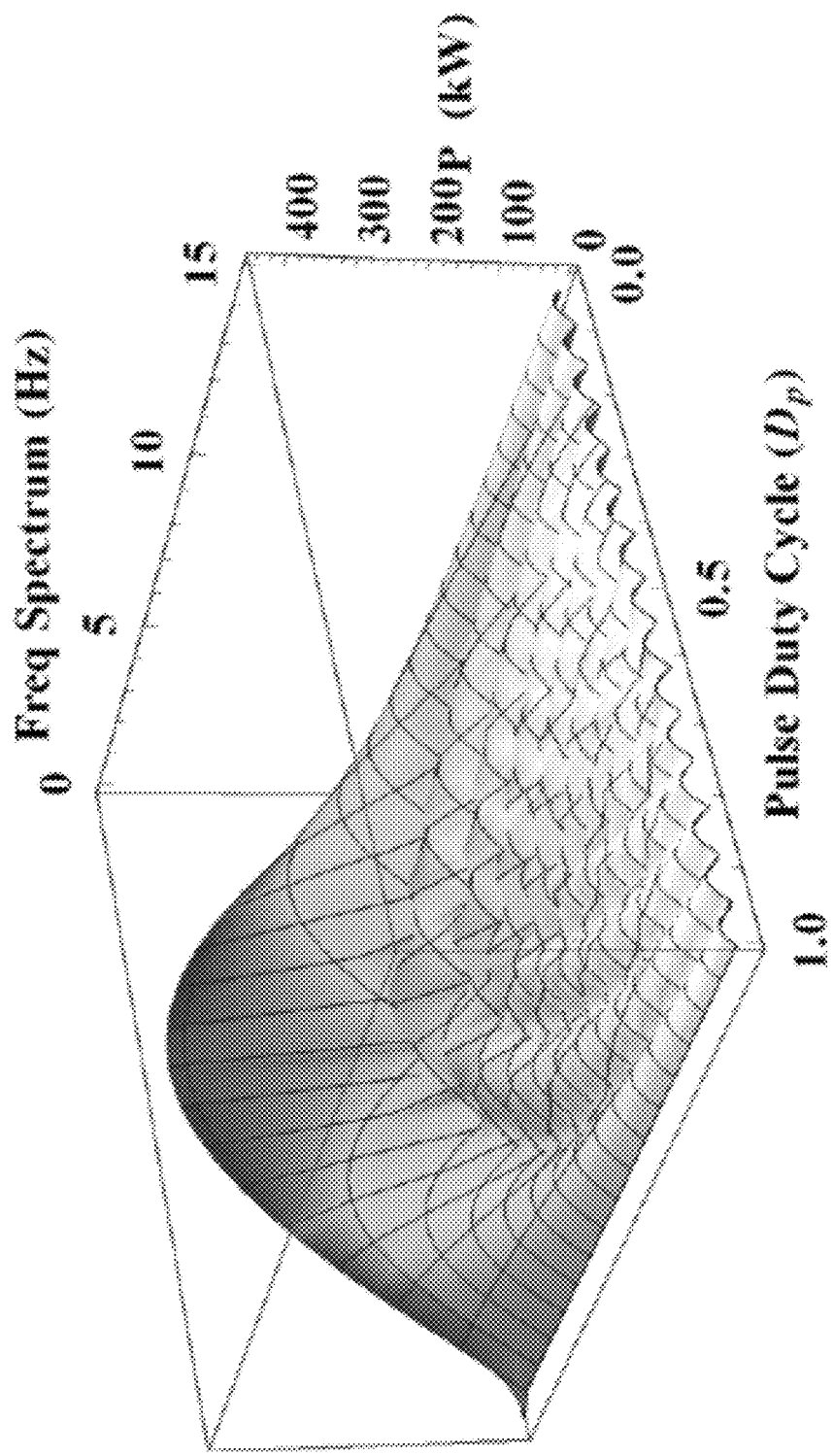
FIG. 11 is a plot of the energy storage power surface versus frequency and duty cycle.

As shown in FIGS. 10A-10C, as the load duty cycle increases, there is more low frequency content to the power signal. This is expected since the duty cycle $D_p$ also represents the average of the signal. The most significant feature of the ESS control is that the overall energy trade with the ESS element is zero. When the duty cycle is 0.5 (FIG. 10B), it can be observed that the maximum energy is requested from the storage system hence, verifies (11). FIG. 11 shows the entire design and specification space for the frequency spectrum of the baseline ESS power versus the duty cycle and the frequency of a PPL.

Pulse Load System with Generalized Band-limited Storage

Figures 12A, 12B, 12C:
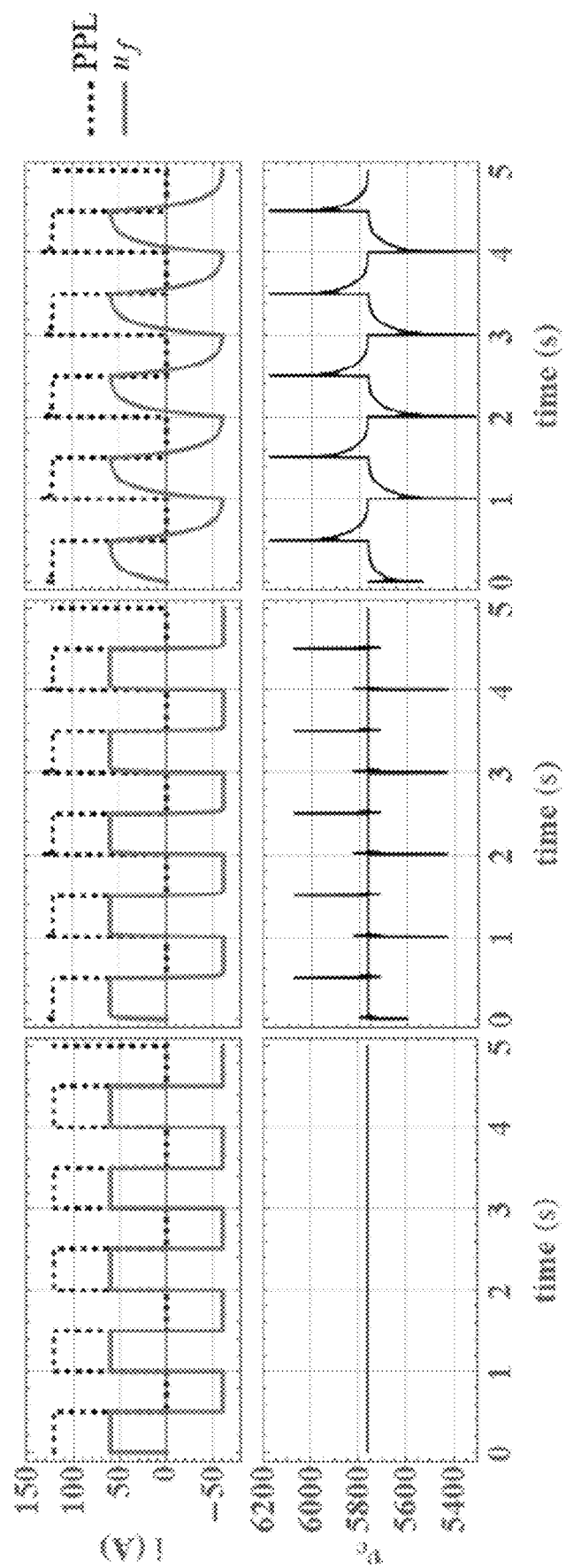
FIGS. 12A-12C are graphs of pulse load and energy storage currents and the regulated load voltage.
Figure 13:
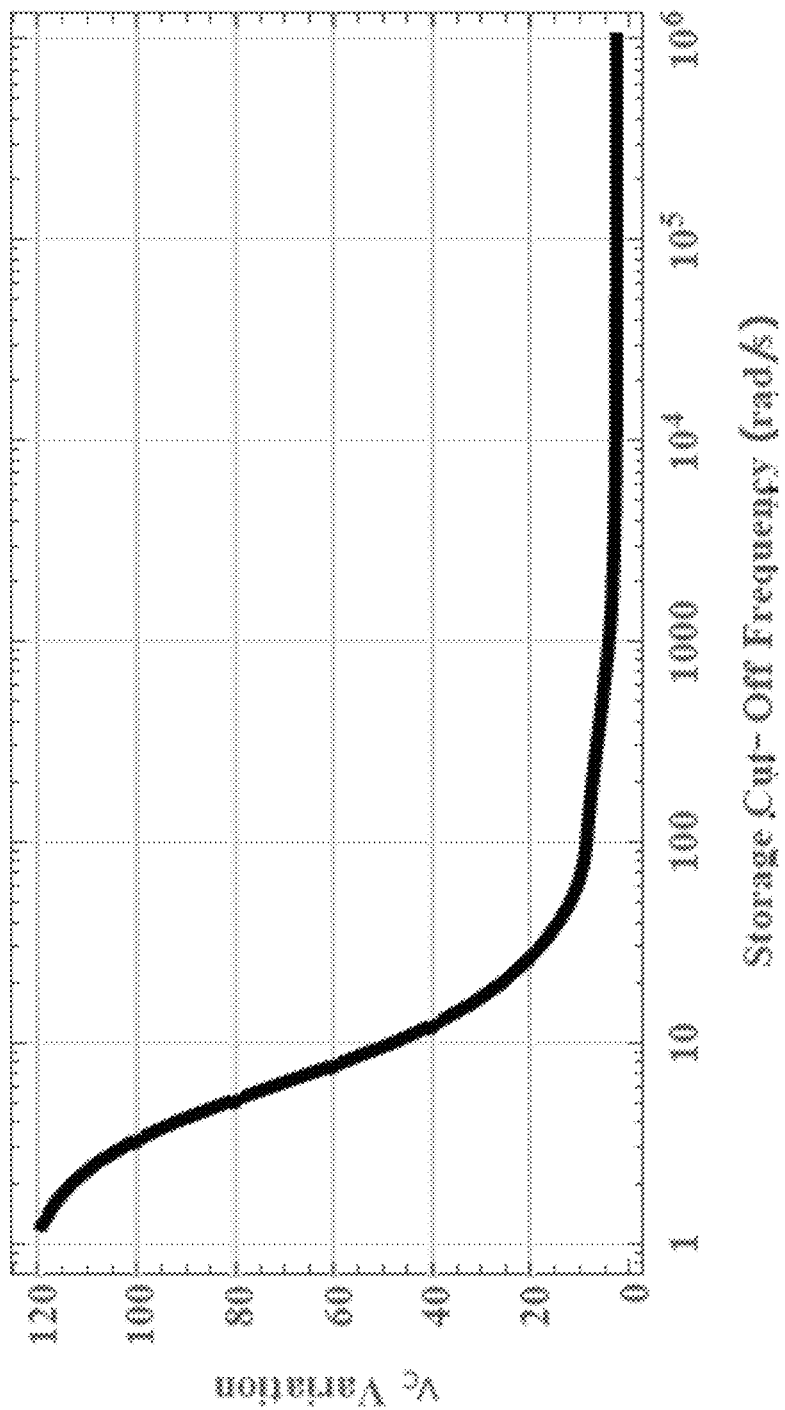
FIG. 13 is a graph of the pulse load voltage variation versus the storage cut-off frequency.

FIGS. 12A, 12B, and 12C present the load current and the ESS injected current for when the cut-off frequency is 100000 (rad/s), 100 (rad/s), and 10 (rad/s), respectively. It can be seen that as the storage element becomes more limited in frequency response, the voltage regulation suffers. This is because the system with lower (0 cut-off is not able to track the baseline ESS control signal as effectively as a system with higher bandwidth of operation. The voltage variation versus the storage cut-off frequency ($\omega_{cut-off}$ from (26)) is shown in FIG. 13. The plot in FIG. 13 represents an ESS technology selection and design tool to understand the resulting bus voltage variations versus the ESS cut-off response.

Pulse Load with Battery and Flywheel Hybrid Storage

Figure 14A:
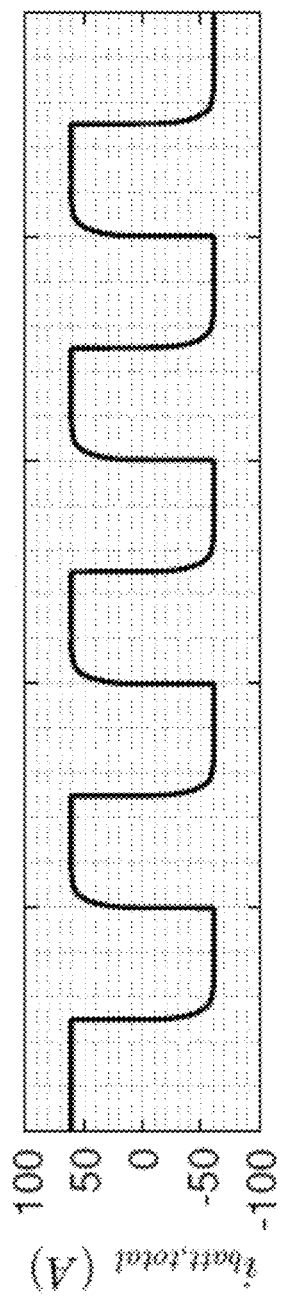
FIG. 14A is a graph of the overall injected currents for a battery.
Figure 14B:
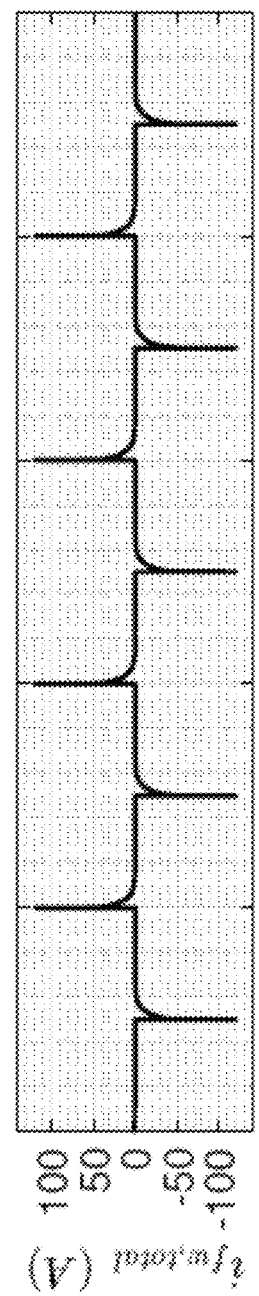
FIG. 14B is a graph of the overall injected currents for a flywheel system.
Figure 14C:
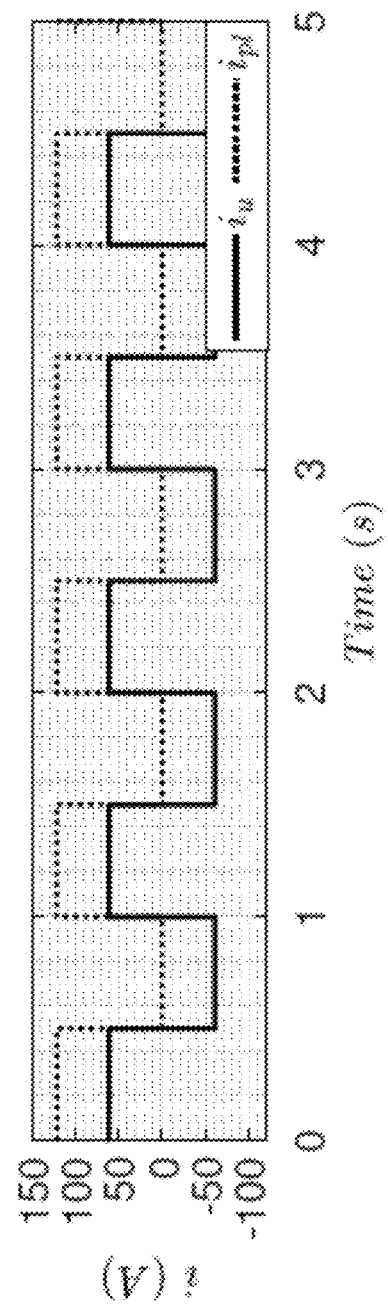
FIG. 14C is a graph of pulsed load and hybrid storage system currents.
Figure 15A:
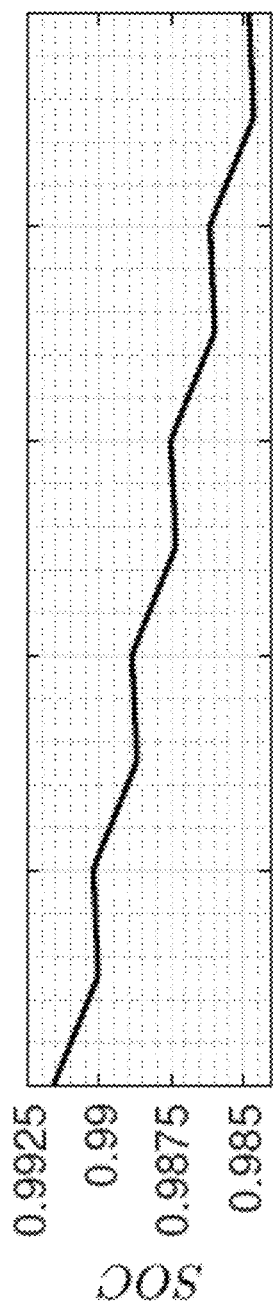
FIG. 15A is a graph of individual cell battery SOC.
Figure 15B:
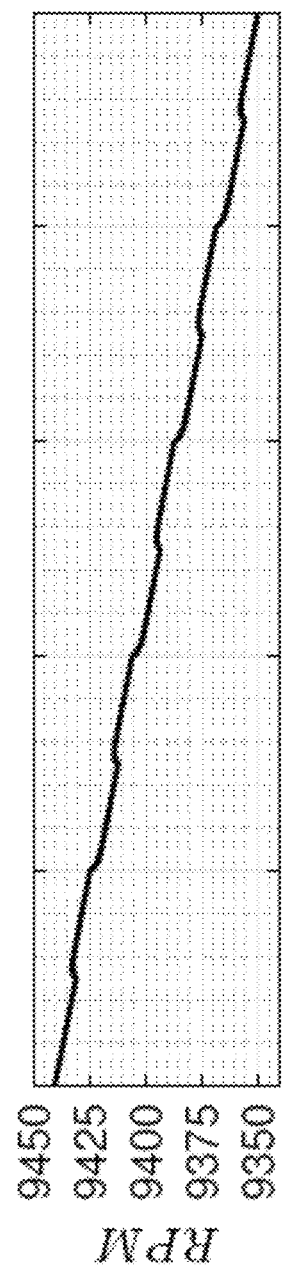
FIG. 15B is a graph flywheel RPM.
Figure 15C:
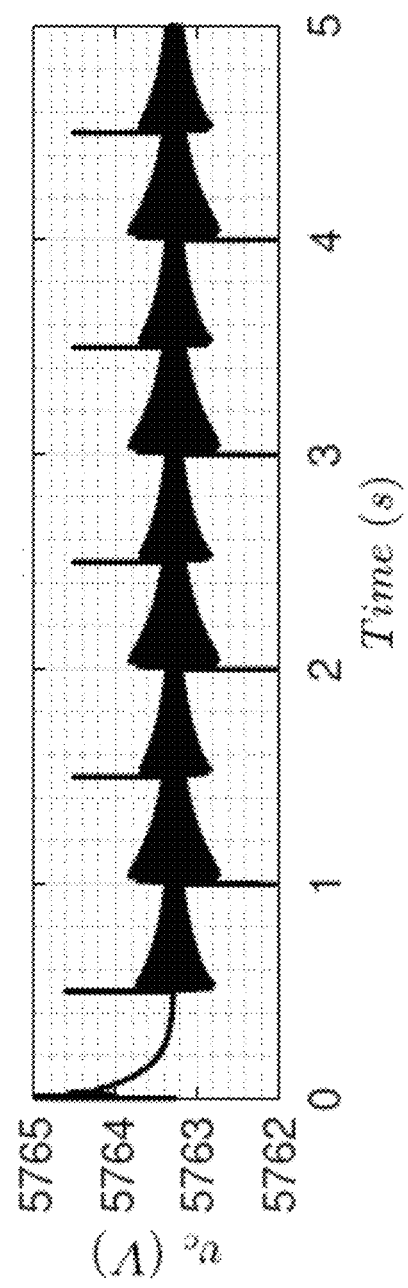
FIG. 15C is a graph of pulse load voltage.

In this example, a series and parallel battery and flywheel systems are selected to represent the band-limited ESS. To support the load current and voltage, the battery system comprises 10 parallel and 12 series identical cells. Similarly, the flywheel system comprises 3 parallel and 8 series identical cells. FIGS. 14A and 14B shows the overall injected current by the hybrid battery and flywheel systems, respectively. Here, the battery supplies the majority of the power. This sharing of power is set by (58)-(57). FIG. 14C shows the overall current for the hybrid storage and the pulse load system. FIGS. 15A and 15B show individual battery SOC and flywheel RPM, respectively. Here, the overall energy of individual cells decreases. However, this change is not monotonic, and the cells recharge when the instantaneous load power is more than the average. FIG. 15C shows the load voltage and variations due to the choice in ESS technologies and their resulting response limits. The amount of voltage variation is comparable to the results obtained in FIGS. 12 and 13.

The present invention has been described as energy storage systems for electrical microgrids with pulsed power loads. It will be understood that the above description is merely illustrative of the applications of the principles of the present invention, the scope of which is to be determined by the claims viewed in light of the specification. Other variants and modifications of the invention will be apparent to those of skill in the art.

We claim:
1. An electrical microgrid, comprising
a pulsed power load that provides a load transient to a bus of the electrical microgrid, wherein the pulsed power load has a time-varying power consumption waveform P(t) having a duty cycle, $D_p$, a period, $T_p$, and a peak value, $P_{peak}$,
an energy storage system,
a bus interface converter electrically connected between the energy storage system and the bus, the bus interface converter having a control input duty cycle to control switching of the bus interface converter to provide an injected current at the bus from the energy storage system, and a controller that adjusts the control input duty cycle of the bus interface converter to control the injected current at the bus to track an injected current reference value, u, so as to mitigate the load transient from the pulsed power load and maintain a desired load voltage at the bus, calculated according to the equation:

$$u = -\frac{2(R + R_L)(D_P P_{peak} - P(t))}{\sqrt{R(\lambda^2 R v_b^2 - 4R_L D_p P_{peak}(R + R_L))} + \lambda R v_b}$$

where R is a modeled resistance of the bus interface converter, $R_L$ is a modeled line resistance of the microgrid, $\lambda$ is the control input duty cycle, and $v_b$ is a voltage of the bus.

2. The electrical microgrid of claim 1, wherein the energy storage system has a baseline energy storage capacity greater or equal to $W_u = -(D_p-1)D_p T_p P_{peak}$.

3. The electrical microgrid of claim 1, wherein the energy storage system comprises at least one of a supercapacitor, flywheel, or battery.

4. The electrical microgrid of claim 3, wherein the energy storage system comprises a hybrid battery and flywheel configuration.

5. The electrical microgrid of claim 1, wherein the energy storage system comprises a spinning mass flywheel and a permanent magnet DC machine and the bus interface converter comprises a buck converter.

6. The electrical microgrid of claim 1, wherein the energy storage system comprises a battery and the bus interface converter comprises a boost converter.

* * * * *